United States Patent
Yamagata et al.

(10) Patent No.: US 8,964,281 B2
(45) Date of Patent: Feb. 24, 2015

(54) OPTICAL PROBE

(75) Inventors: Masaoki Yamagata, Kawasaki (JP); Kentaro Nemoto, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 280 days.

(21) Appl. No.: 13/611,775

(22) Filed: Sep. 12, 2012

(65) Prior Publication Data

US 2013/0083384 A1 Apr. 4, 2013

(30) Foreign Application Priority Data

Sep. 30, 2011 (JP) ................ 2011-216055

(51) Int. Cl.
 *G02B 26/08* (2006.01)
 *G01B 11/24* (2006.01)
 *G02B 27/09* (2006.01)
(52) U.S. Cl.
 CPC ............ *G02B 26/0841* (2013.01); *G01B 11/24* (2013.01); *G02B 27/0916* (2013.01); *G02B 27/0977* (2013.01)
 USPC ........ 359/291; 359/224.1; 359/641; 359/710; 356/612
(58) Field of Classification Search
 CPC .. G02B 26/0833; G02B 7/32; G02B 27/0916; G02B 27/0977; H04N 5/335; G06K 9/2036; G01B 11/24; G01B 11/2518
 USPC .......... 359/224.1–224.2, 227, 230, 291–292; 356/608, 612
 See application file for complete search history.

(56) References Cited

U.S. PATENT DOCUMENTS

| 5,659,420 | A | * | 8/1997 | Wakai et al. ............ 359/368 |
| 2005/0052346 | A1 | | 3/2005 | Koyama |
| 2008/0237505 | A1 | | 10/2008 | Rodrigues et al. |
| 2009/0205088 | A1 | | 8/2009 | Crampton et al. |
| 2009/0284757 | A1 | | 11/2009 | Mayer et al. |
| 2011/0020956 | A1 | * | 1/2011 | Nemoto et al. .............. 438/7 |

FOREIGN PATENT DOCUMENTS

| CN | 1591162 A | 3/2005 |
| CN | 101458067 A | 6/2009 |
| CN | 102175180 A | 9/2011 |
| JP | 2009-534969 | 9/2009 |

OTHER PUBLICATIONS

European Search Report, Application No. 12184000.3, dated Jan. 4, 2013, 5 pages.
Chinese Office action, date of mailing: Nov. 2, 2014, English translation included.

* cited by examiner

*Primary Examiner* — James Phan
(74) *Attorney, Agent, or Firm* — Rankin, Hill & Clark LLP

(57) ABSTRACT

An optical probe includes a laser light source that emits laser light, a collimator lens that converts the laser light into parallel light, a light shape changing section that converts the parallel light into linear laser light, an irradiating section to irradiate an object with a selected part of the linear laser light, an image pickup section that picks up an image of the object based on the laser light reflected from the object, and a controller that controls irradiation of the linear laser light. The linear laser light is composed of a plurality of parts including one end part and the other end part; and the irradiating section irradiates the object with the parts of the linear laser light sequentially from the one end part to the other end part.

12 Claims, 14 Drawing Sheets

OPTICAL PROBE

BACKGROUND OF THE INVENTION

1. Field of the Invention

The present invention relates to an optical probe.

2. Description of Related Art

Non-contact optical probes have conventionally been known (see Japanese Translation Publication of PCT International Application No. 2009-534969, for example). Such non-contact optical probes irradiate an object to be measured (hereinafter referred to as a work) with laser light, detect light reflected from the surface of the work, and obtain position coordinates of the respective spots of the work.

As an example of the non-contact optical probes, a linear optical probe 100 as shown in FIG. 10 has been known. The linear optical probe 100 uses a beam expander 103 that allows laser light to change shape into light L1 that is linear in shape (hereinafter referred to as linear laser light). In the linear optical probe 100, laser light emitted from a laser light source 101 is converted into parallel light with a collimator lens 102. Then, the beam expander 103 allows the parallel light to change shape into linear laser light L1. Thus, a work W is irradiated with the linear laser light L1. The linear laser light L1 thrown to the work W is reflected on the surface of the work W to be incident upon an image pickup element (not shown). In this way, the linear optical probe 100 can measure the form of the work W "at one time".

As another example of the non-contact optical probes, a flying spot optical probe 200 as shown in FIG. 11 has been known. The flying spot optical probe 200 uses a rotary galvanometer mirror 203. In the flying spot optical probe 200, laser light emitted from a laser light source 201 is incident upon the galvanometer mirror 203 through a mirror 202. Then, discrete points of light L2 (hereinafter referred to as point laser light) reflected from the galvanometer mirror 203 irradiate a work W. The galvanometer mirror 203 is driven to rotate with respect to the incident light. The point laser light L2 scans the surface of the work W in such a way that the point laser light L2 draws a line in accordance with the rotary drive of the galvanometer mirror 203. The point laser light L2 which has scanned the surface of the work W is reflected thereon to be incident upon an image pickup element (not shown). In this way, the flying spot optical probe 200 can measure the form of the work W "in sequence".

As still another example of the non-contact optical probes, a rotating mirror optical probe 300 as shown in FIG. 12 has been known. The rotating mirror optical probe 300 uses a rotary polygon mirror 303. In the rotating mirror optical probe 300, laser light emitted from a laser light source 301 is incident upon the polygon mirror 303 through a mirror 302. Then, discrete points of light L3 (hereinafter referred to as point laser light) reflected from the polygon mirror 303 irradiate a work W. The polygon mirror 303 is driven to rotate with respect to the incident light. The point laser light L3 scans the surface of the work W in such a way that the point laser light L3 draws a line in accordance with the rotary drive of the polygon mirror 303. The point laser light L3 which has scanned the surface of the work W is reflected thereon to be incident upon an image pickup element (not shown). In this way, the rotating mirror optical probe 300 can measure the form of the work W "in sequence", similarly to the flying spot optical probe 200.

In general, a light-section method is used for non-contact optical probes, as a measurement principle. For example, as shown in FIG. 13 and FIG. 14, when the linear optical probe 100 measures the form of a work W in the light-section method, the surface of the work W is irradiated with the linear laser light L1 from the laser light source 101 through an optical system (a collimator lens and a beam expander, which are not shown). Therefore, it is only necessary to pick up an image of the area, which is irradiated with the laser light, by an image pickup element 104 to measure the form of the work W. The linear optical probe 100, which does not have a moving mechanism in the optical system, is easier to maintain compared with the flying spot optical probe 200 and the rotating mirror optical probe 300.

When a work having a mirror plane or a corner, in particular, is irradiated with laser light from a conventional optical probe, a false shape (virtual image) is sometimes obtained due to multiple reflections.

In the case of the linear optical probe 100, as shown in FIG. 15 and FIG. 16, laser light is constantly thrown in a linear shape, and the form of the work W is obtained at one time. Accordingly, when a virtual image is formed due to multiple reflections, a real image R and a virtual image V cannot be distinguished from each other, which is inconvenient.

In this regard, the flying spot optical probe 200 and the rotating mirror optical probe 300 irradiate a work W in such a way that the point laser light draws a line thereon to obtain the form of the work W in sequence. Accordingly, the flying spot optical probe 200 and the rotating mirror optical probe 300 can relatively easily recognize a virtual image formed due to multiple reflections.

The flying spot optical probe 200 and the rotating mirror optical probe 300, however, are more complex in structure compared with the linear optical probe 100 because each of the probes 200 and 300 needs a moving mechanism in the optical system thereof as described above. Accordingly, maintenance of the probes 200 and 300 is troublesome.

Further, in the case of the flying spot optical probe 200, which needs to control an operating angle of the galvanometer mirror 203 with a motor or the like, the form of a work W cannot be accurately measured unless the operating angle of the galvanometer mirror 203 is controlled precisely. Still further, since the galvanometer mirror 203 is a moving mechanism, it is subject to performance deterioration after a long period of use. Therefore, it is essential to maintain the galvanometer mirror 203.

Furthermore, in the case of the rotating mirror optical probe 300, it is necessary to improve the profile accuracy (flatness, in particular) of the polygon mirror 303 as much as possible to take an accurate measurement of the form of a work W. That is because the measurement accuracy depends on the profile accuracy of the polygon mirror 303. Since the polygon mirror 303 is mirrors of a polyhedron, the form of a work W cannot be accurately measured unless the faces of the polygon mirror 303 have uniform surface accuracy.

SUMMARY OF THE INVENTION

The present invention provides an optical probe that can measure the form of an object in sequence without being equipped with a moving mechanism in the optical system.

According to an aspect of the present invention, there is provided an optical probe including: a laser light source that emits laser light; a collimator lens that converts the laser light emitted from the laser light source into parallel light; a light shape changing section that allows the parallel light to change shape into linear laser light; an irradiating section to irradiate an object to be measured with a selected part of the linear laser light; an image pickup section that picks up an image of the object based on the laser light reflected from a surface of the object irradiated with the selected part of the linear laser light;

and a controller that controls irradiation of the linear laser light by the irradiating section, wherein the linear laser light is composed of a plurality of parts including one end part and the other end part; and the controller controls the irradiating section so that the irradiating section irradiates the object with the parts of the linear laser light sequentially from the one end part to the other end part.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

An embodiment of the present invention will be described with reference to the drawings.

First Embodiment

Figure 1:
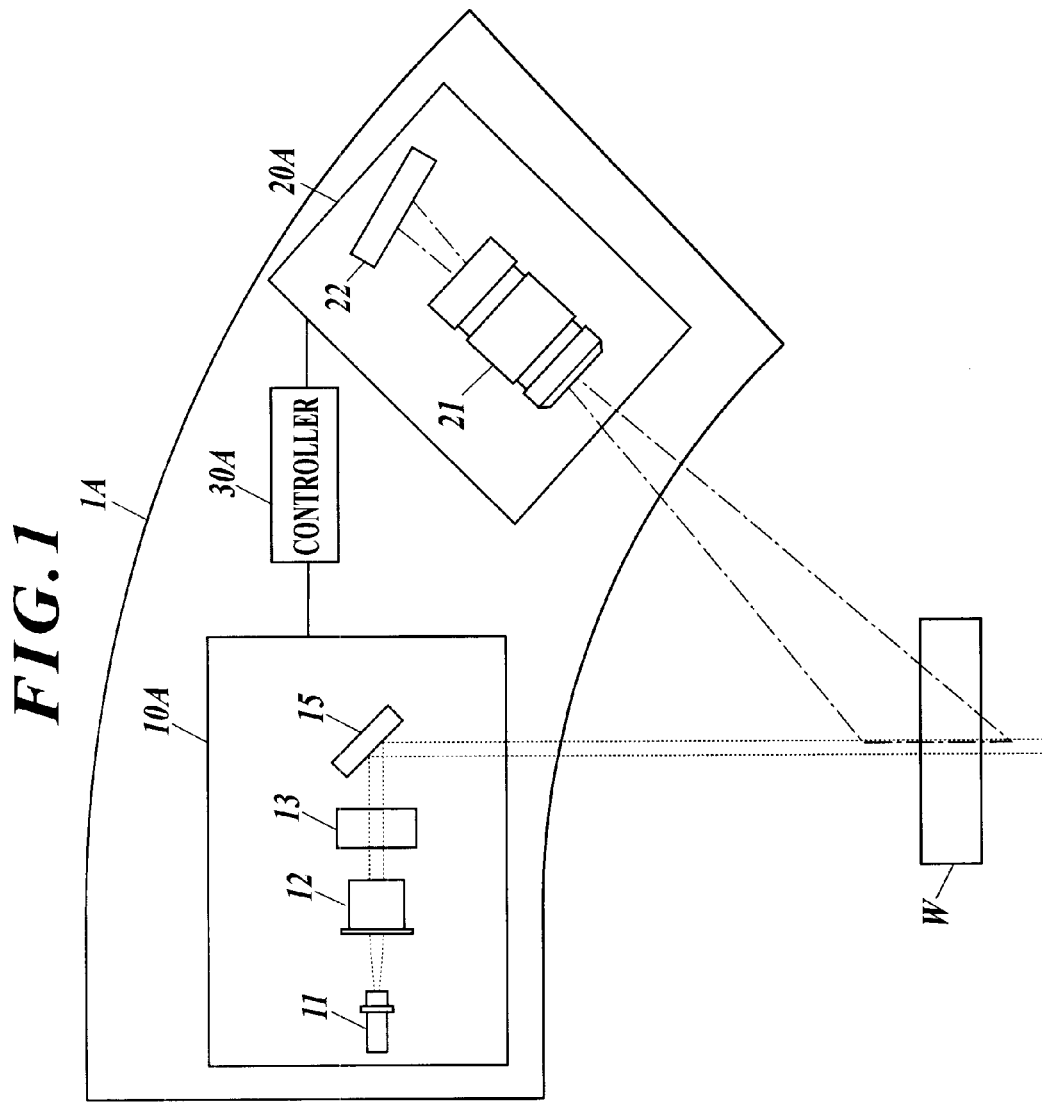
FIG. 1 is a schematic view of the configuration of an optical probe according to a first embodiment.

An optical probe 1A according to a first embodiment is a non-contact optical probe that scans the surface of a work W and obtains a position coordinate of each spot of the work W. As shown in FIG. 1, the optical probe 1A includes an optical section 10A, an image pickup section 20A, and a controller 30A.

Figure 2:
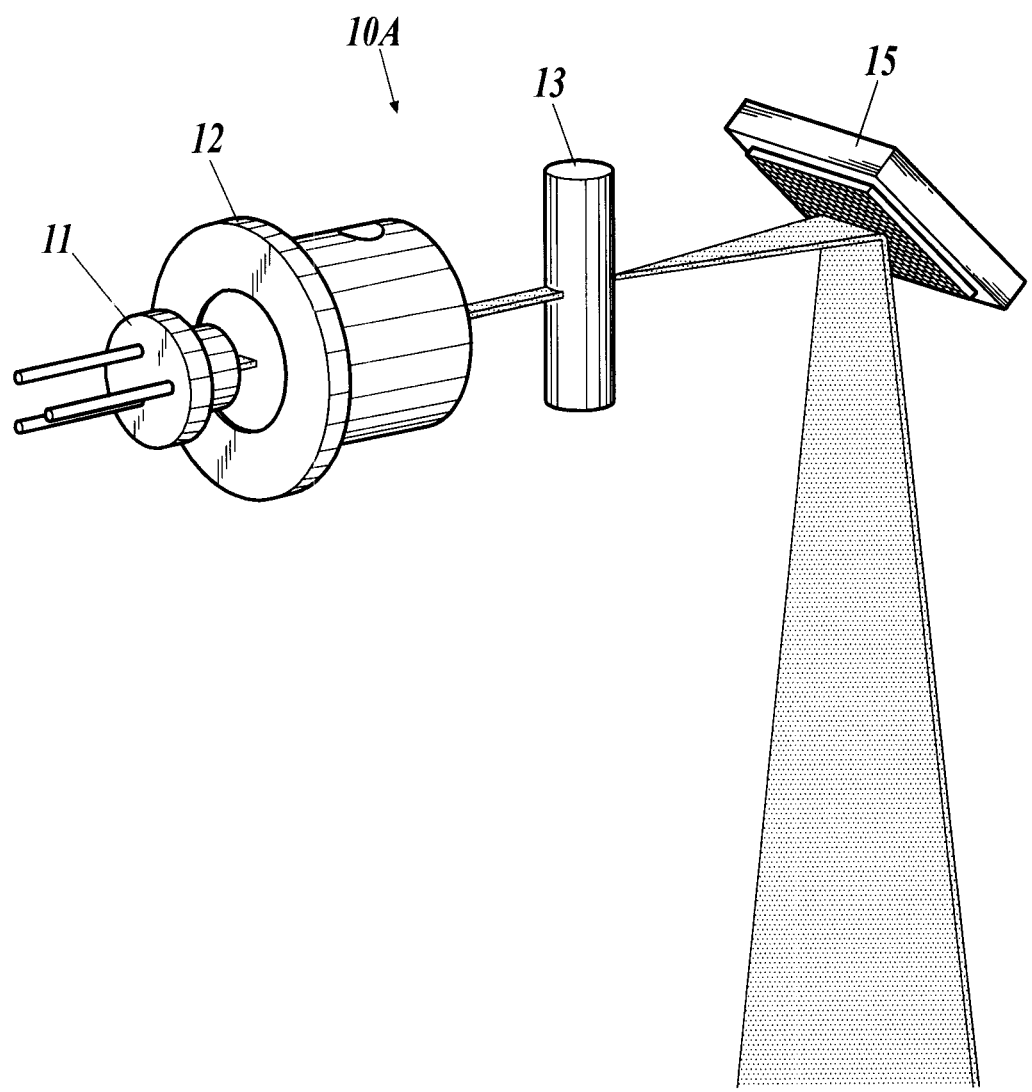
FIG. 2 is a schematic view of an optical system in the optical probe of the first embodiment.

As shown in FIG. 1 and FIG. 2, the optical section 10A includes a laser light source 11, a collimator lens 12, a beam expander 13, and a DMD (Digital Mirror Device) 15.

The laser light source 11 is composed of an LD (Laser Diode), for example, and generates and emits laser light. The laser light is emitted from the laser light source 11 to the collimator lens 12 which is disposed on the right of the laser light source 11 in the horizontal direction.

The collimator lens 12 converts the light incident from the laser light source 11 into parallel light, and allows the parallel light to travel to the beam expander 13, which is disposed on the right of the collimator lens 12 in the horizontal direction.

The beam expander 13 is a rod lens or a cylindrical lens, for example. The beam expander 13, which serves as a light shape changing section, allows the parallel light from the collimator lens 12 to change shape into linear laser light. When the parallel light passes through the beam expander 13 from left in the horizontal direction, the parallel light is changed into a beam in a linear shape (i.e., linear laser light). Then, the linear laser light travels to the DMD 15 which is disposed on the right of the beam expander 13 in the horizontal direction.

The DMD 15 is an approximately-rectangular optical device which includes an IC (Integrated Circuit) with several hundred thousand to several million micromirrors arranged thereon in grid-like fashion. The DMD 15 reflects the linear laser light coming from the beam expander 13. Each of the micromirrors corresponds to one pixel of a display device. The controller 30A, which will be described later, performs ON/OFF control by controlling the tilt of the micromirrors. Among the linear laser light, the light reflected on an on-state micromirror travels downward to irradiate the work W placed below. On the other hand, the light reflected on an off-state micromirror does not travel to the work W but travels to an absorber in the probe. Each of the micromirrors is separately driven, and thereby, reflection of light can be controlled for every micromirror, i.e., for every display pixel. Thus, the DMD 15 serves as a light reflecting section that reflects a selected part of the linear laser light. In addition, the laser light source 11, the collimator lens 12, the beam expander 13, and the DMD 15 are disposed on the same optical axis.

The image pickup section 20A includes a light-receiving lens 21 and an image sensor 22. The light-receiving lens 21 transmits the laser light reflected from the surface of the work W. The laser light transmitted through the light-receiving lens 21 is incident upon the image sensor 22 which is disposed on the same optical axis as the light-receiving lens 21.

The image sensor 22 is an image pickup element that picks up an image of the work W based on the laser light reflected from the surface of the work W to obtain the coordinate value of each spot of the work W. The image sensor 22 outputs the obtained coordinate value to the controller 30A. Thus, the image sensor 22 serves as an image pickup section that picks up an image of the work W based on the laser light reflected on the DMD 15, and further reflected on the surface of the work W.

The controller 30A includes a CPU (Central Processing Unit), a RAM (Random Access Memory), a ROM (Read Only Memory), and the like, and is connected to the optical section 10A, and the image pickup section 20A.

The CPU reads various processing programs stored in the ROM to expand the programs into the RAM, and executes various types of processing in cooperation with the expanded programs. Thus, the CPU performs an overall control of the optical probe 1A.

The RAM expands the processing programs, which are executed by the CPU, into a program storage area within the RAM, and stores input data and processing result data, which is produced through the execution of the programs, in a data storage area.

The ROM, which is composed of a non-volatile semiconductor memory, stores a system program to be executed by the CPU, various processing programs to be executed in the system program, data to be used when the various processing programs are executed, and data of various processing results acquired through arithmetic processing by the CPU. The programs are stored in the ROM in the form of a computer-readable program code.

The controller 30A controls the tilts of the respective micromirrors of the DMD 15 for every micromirror to control reflection of the linear laser light. Specifically, when the linear laser light is thrown to some of the micromirrors, the controller 30A turns on the micromirrors, to which the linear laser light is thrown, one by one sequentially from one end to the other end thereof, and turns off the micromirrors except for a micromirror that has just been turned on. Thereby, the parts constituting the linear laser light travel downward, i.e., in the direction of the work W sequentially in the order from one end part to the other end part of the linear laser light.

The controller 30A determines existence or non-existence of a virtual image based on an image of the work W picked up by the image sensor 22. If it is determined that a virtual image exists, the controller 30A controls a part of the linear laser light which causes the formation of the virtual image, not to travel toward the work W.

In the optical probe 1A, the shape of the work W is continuously picked up by the image sensor 22 in sequence. Accordingly, existence or non-existence of a virtual image can be determined in such a way that, when a picked-up image position has changed from the last picked-up image position by a predetermined threshold value or more, it is determined that a virtual image exists.

Figure 3:
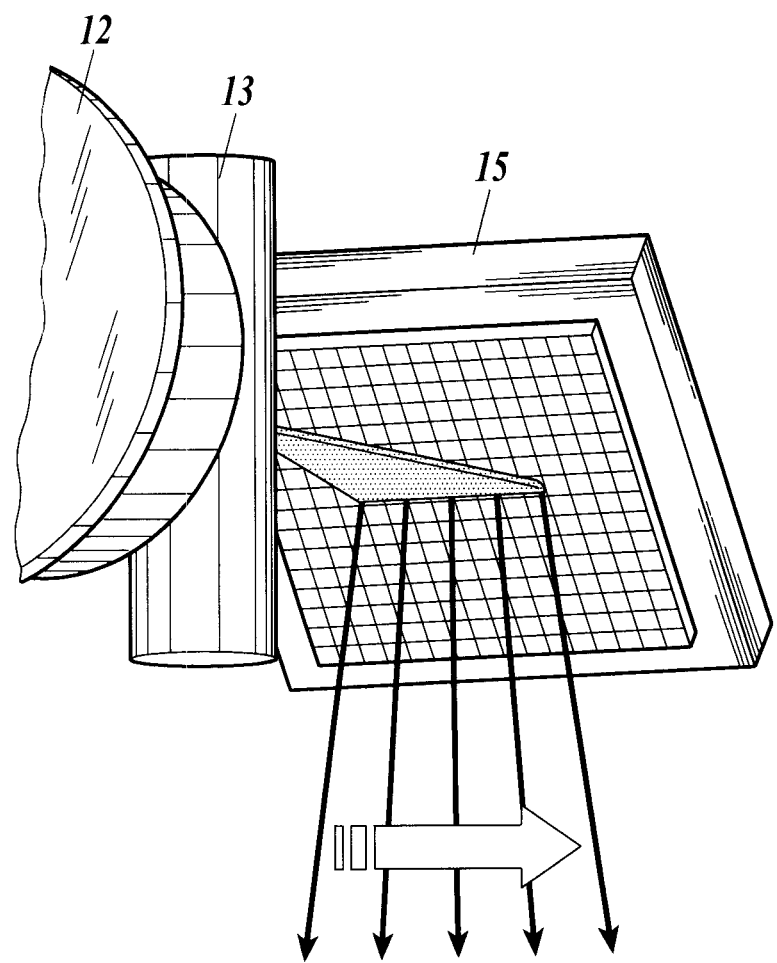
FIG. 3 is a schematic view illustrating a state in which an object to be measured is irradiated with point laser light in such a way that the point laser light draws a line on the object.

Next, the operation of the optical probe 1A according to the first embodiment will be described with reference to FIG. 3 to FIG. 5.

First, laser light is emitted from the laser light source 11 of the optical probe 1A. The laser light emitted from the laser light source 11 goes to the beam expander 13 through the collimator lens 12. The beam expander 13 allows the light from the collimator lens 12 to change shape into linear laser light.

Then, the linear laser light travels to the DMD 15. At the DMD 15, the reflection of the linear laser light is controlled for every micromirror.

Specifically, when the linear laser light is thrown to some of the micromirrors in the DMD 15, the controller 30A turns on the micromirrors, to which the linear laser light is thrown, one by one sequentially from one end to the other end thereof, and turns off the micromirrors except for a micromirror that has just been turned on. That is, the number of micromirrors that is in an on-state is always only one, and only the light reflected on the on-state micromirror travels toward the work W. Therefore, the work W is always irradiated with point laser light.

The micromirrors, to which the linear laser light is thrown, are sequentially turned on one by one from one end to the other end of the micromirrors. Therefore, the work W is irradiated with the point laser light in such a way that the point laser light draws a line thereon (See FIG. 3).

Thus, the optical probe 1A can measure the form of the work W in sequence without being equipped with a moving mechanism, such as a galvanometer mirror or a polygon mirror, in the optical system. Accordingly, it is not necessary to maintain the moving mechanism and to adjust the accuracy of the moving mechanism. In addition, even when a virtual image is formed due to multiple reflections, the virtual image can easily be recognized.

The light, which is irradiated on the work W in the above-described way, is reflected on the surface of the work W to be incident upon the image sensor 22 through the light-receiving lens 21. Thus, the image of the work W can be picked up. Then, the controller 30A determines existence or non-existence of a virtual image based on the image of the work W picked up by the image sensor 22. Since the optical probe 1A irradiates the work W in such a way that the point laser light draws a line on the surface of the work W, even when a virtual image is formed due to multiple reflections, the virtual image can easily be recognized. Furthermore, the light that causes the formation of the virtual image can be identified in the linear laser light.

Figure 4:
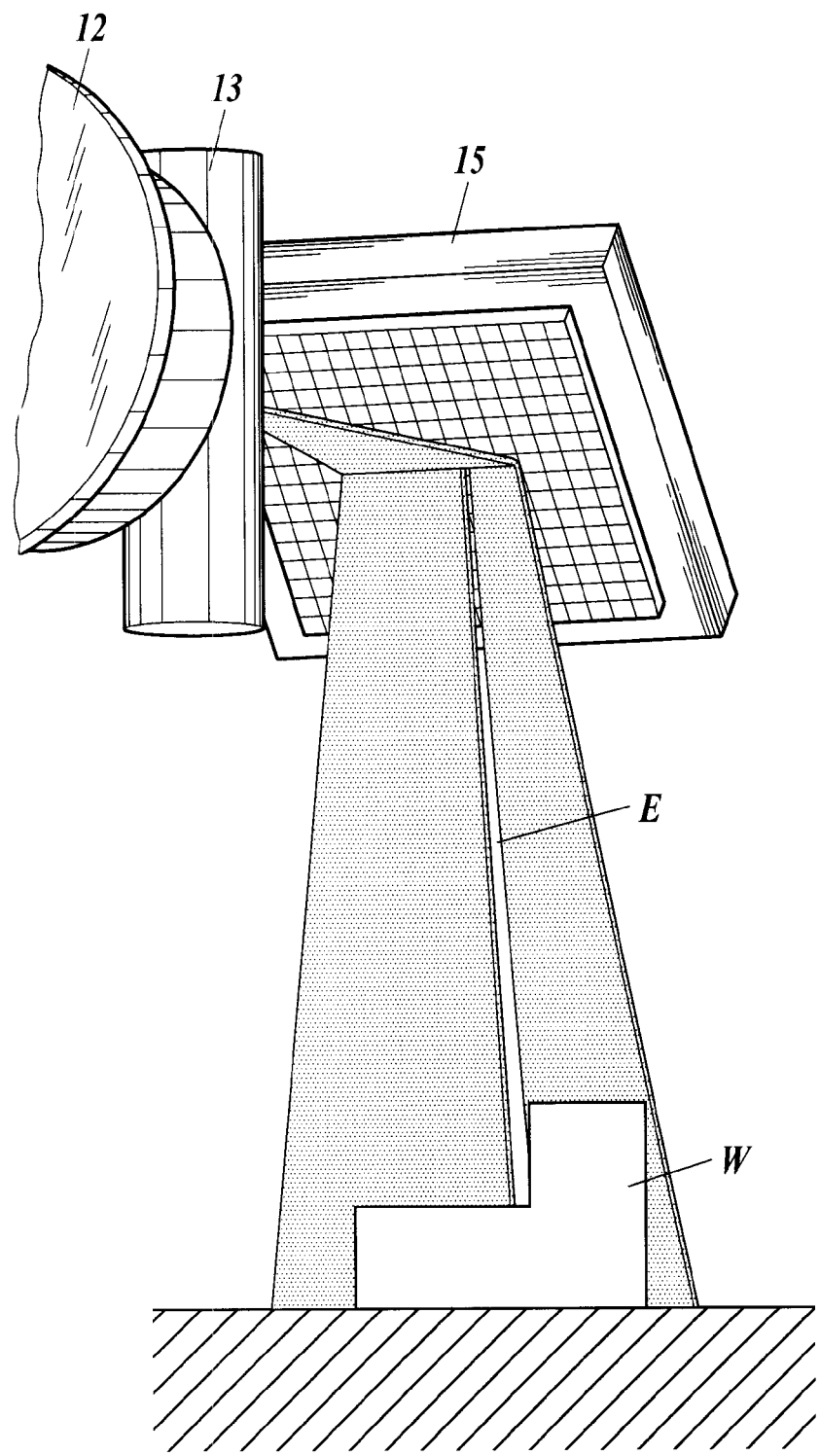
FIG. 4 is a schematic view illustrating a state in which the micromirrors, involved in formation of a virtual image, are turned off so that the light reflected on the turned-off micromirrors does not travel toward an object to be measured.
Figure 5:
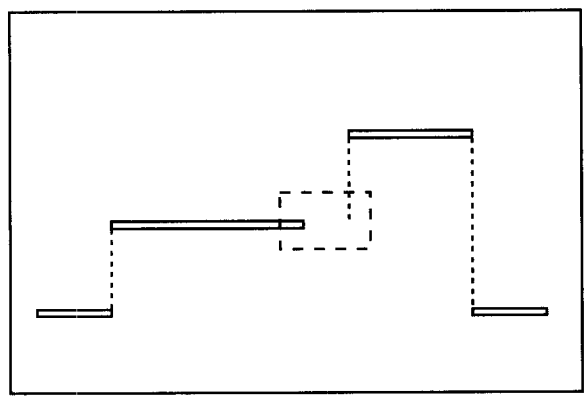
FIG. 5 shows an example of the form of an object to be measured picked up by the optical probe of FIG. 4.

When determining that a virtual image exists, the controller 30A prevents apart of the linear laser light, which causes the formation of the virtual image, from traveling toward the work W, as shown in FIG. 4. That is, among the micromirrors of the DMD 15 to which the linear laser light is thrown, the micromirrors involved in the formation of the virtual image are turned off so that the light reflected on the off-state micromirrors is prevented from travelling toward the work W. Accordingly, the formation of a virtual image can be prevented (see FIG. 5).

As described above, the optical probe 1A of the first embodiment includes a laser light source 11 that emits laser light; the collimator lens 12 that converts the laser light emitted from the laser light source 11 into parallel light; the beam expander 13 that allows the parallel light to change shape into linear laser light; an irradiating section that irradiates a work W with a selected part of the linear laser light; the image sensor 22 that picks up an image of the work W based on the laser light reflected from the surface of the object when the work W is irradiated with a selected part of the linear laser light; and the controller 30A that controls the irradiation of the linear laser light by the irradiating section. The linear laser light is composed of a plurality of parts (corresponding to the respective micromirrors) including one end part and other end part (corresponding to one end and the other end of the micromirrors); and the controller 30A controls the irradiating section so that the irradiating section irradiates the work W with the parts of the linear laser light sequentially from the one end part to the other end part (corresponding to sequentially turning on the micromirrors one by one).

Thus, the optical probe 1A can measure the form of the work W in sequence without being equipped with a moving mechanism, such as a galvanometer mirror or a polygon mirror, in the optical system. Accordingly, it is not necessary to maintain the moving mechanism and to adjust the accuracy of the moving mechanism. In addition, even when a virtual image is formed due to multiple reflections, the virtual image can easily be recognized.

In particular, according to the optical probe 1A of the first embodiment, the irradiating section is the DMD 15 that includes a plurality of micromirrors arranged in grid-like fashion and that reflects a selected part of the linear laser light. In addition, when the linear laser light is thrown to some of the micromirrors, the controller 30A turns on the micromirrors, to which the linear laser light is thrown, sequentially from one end to the other end thereof, and turns off the micromirrors except for a micromirror that has just been turned on. Since the DMD 15 has good responsiveness to on/off switching and has high use efficiency of light, the optical probe 1A can perform irradiation control by utilizing such advantages of the DMD 15, which results in enhancing the convenience of the optical probe 1A.

Furthermore, according to the optical probe 1A of the first embodiment, the controller 30A determines existence or non-existence of a virtual image based on an image of the work W picked up by the image sensor 22. If it is determined that a virtual image exists, the controller 30A prevents a part of the linear laser light, which causes the formation of the virtual image, from travelling toward the work W (not to irradiate the work W).

Accordingly, the formation of the virtual image is prevented, which results in efficient measurement.

Second Embodiment

Figure 6:
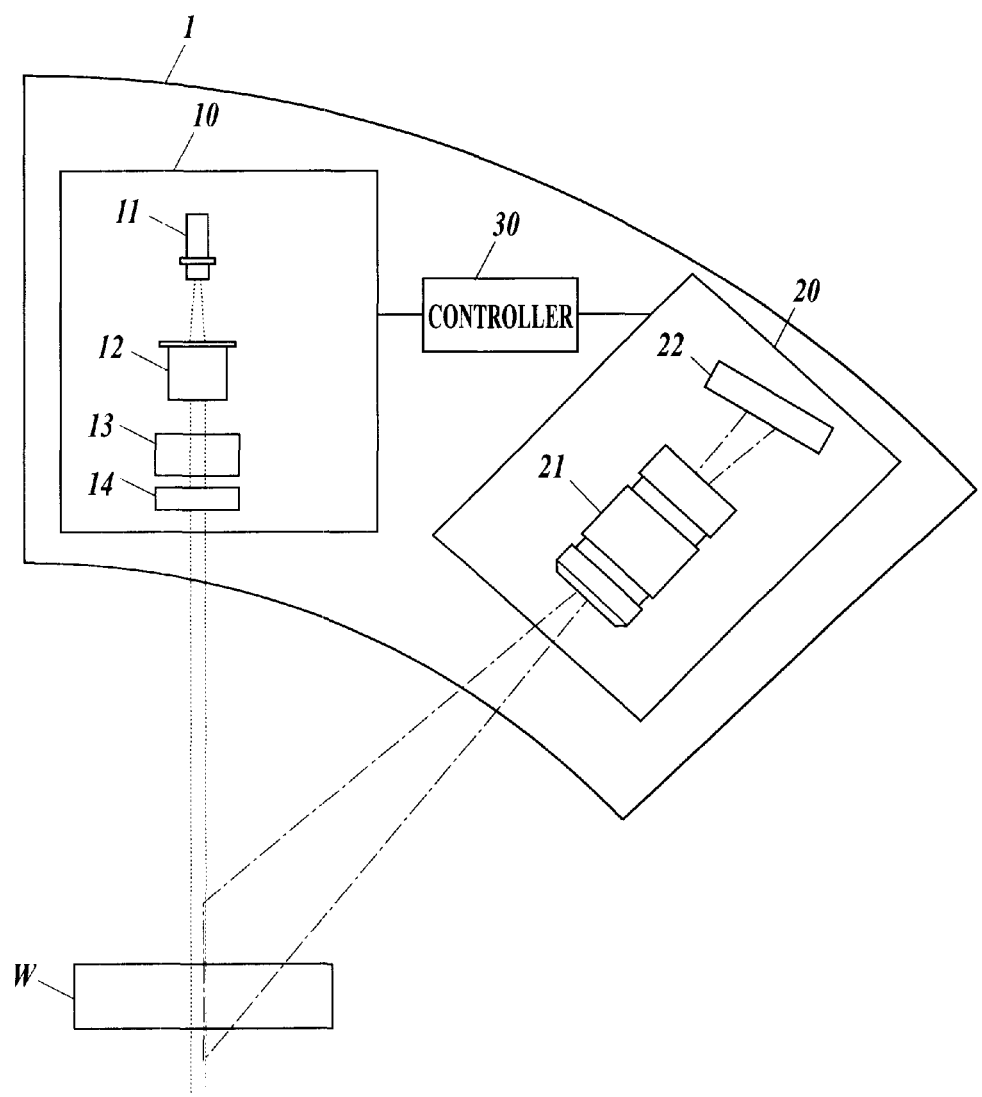
FIG. 6 is a schematic view of the configuration of an optical probe according to a second embodiment.

An optical probe 1 according to a second embodiment is a non-contact optical probe that scans the surface of a work W and obtains a position coordinate of each spot of the work W. As shown in FIG. 6, the optical probe 1 includes an optical section 10, an image pickup section 20, and a controller 30. The structures of the optical probe 1 identical to those of the optical probe 1A of the first embodiment are denoted with the same reference numerals.

The optical section 10 includes a laser light source 11, a collimator lens 12, a beam expander 13, and a liquid crystal shutter array 14.

The laser light source 11 is composed of an LD (Laser Diode), for example, and generates and emits laser light. The laser light is emitted from the laser light source 11 to the collimator lens 12 which is disposed below the laser light source 11.

The collimator lens 12 converts the light incident from the laser light source 11 into parallel light, and allows the parallel light to travel to the beam expander 13, which is disposed below the collimator lens 12.

The beam expander 13 is a rod lens or a cylindrical lens, for example. The beam expander 13, which serves as a light shape changing section, allows the parallel light from the collimator lens 12 to change shape into linear laser light. When the parallel light passes through the beam expander 13 from above, the parallel light is changed into a beam in a linear shape (i.e., linear laser light). Then, the linear laser light travels to the liquid crystal shutter array 14 which is disposed below the beam expander 13.

The liquid crystal shutter array 14 is an array of liquid crystal shutters which are elements to transmit or block light in such a way that the arrangement of liquid crystal molecules is changed by applying or stop applying an electric field to the liquid crystal molecules.

Figure 7:
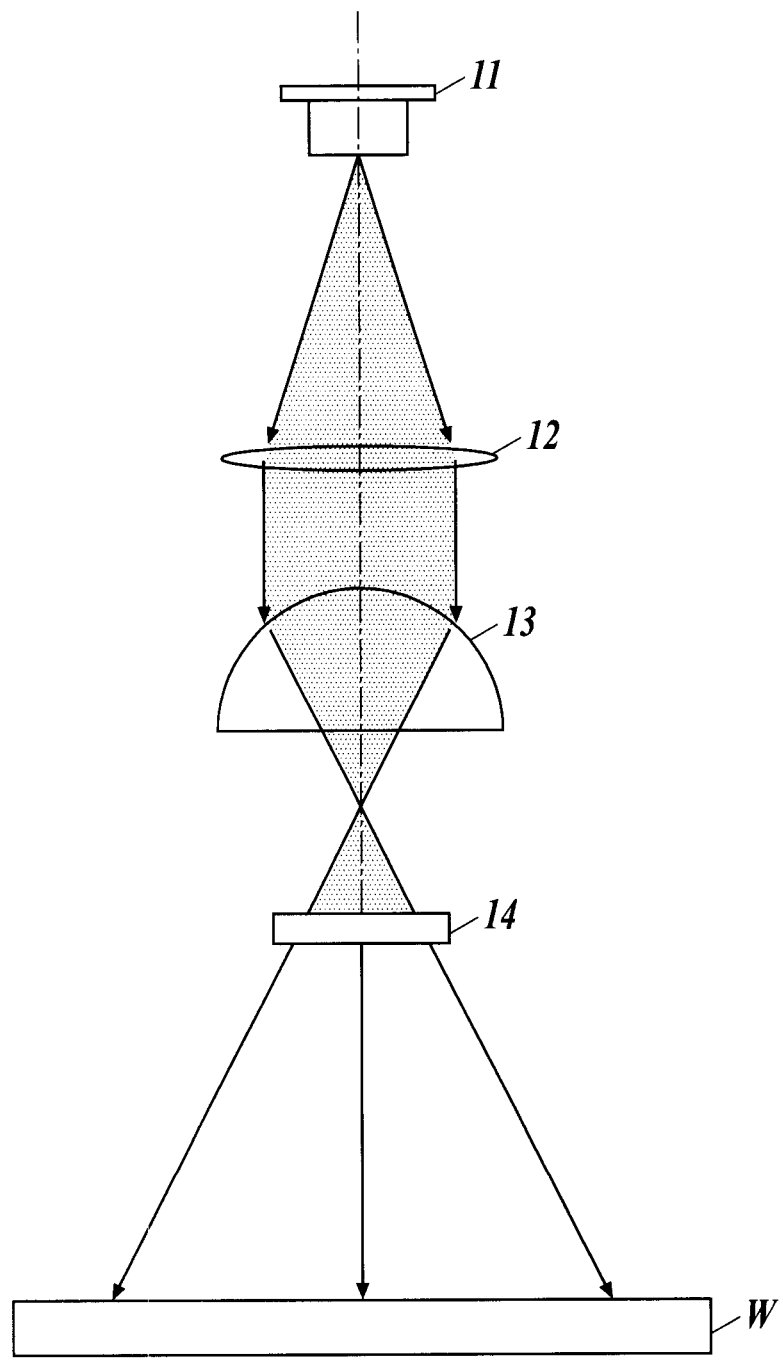
FIG. 7 is a schematic view of an optical system in the optical probe of the second embodiment.

When the linear laser light enters the liquid crystal shutter array 14 from above, the controller 30, which will be described later, controls the cells of the liquid crystal shutters to open or close, and thereby, controls transmission of the linear laser light through the cells for every cell (See FIG. 7). Thus, the liquid crystal shutter array 14 serves as a light transmitting section that transmits a selected part of linear laser light.

The laser light transmitted through the liquid crystal shutter array 14 irradiates a work W placed below.

In addition, the laser light source 11, the collimator lens 12, the beam expander 13, and the liquid crystal shutter array 14 are disposed on the same optical axis.

The image pickup section 20 includes a light-receiving lens 21 and an image sensor 22. The light-receiving lens 21 transmits the laser light reflected from the surface of the work W. The laser light transmitted through the light-receiving lens 21 is incident upon the image sensor 22 which is disposed on the same optical axis as the light-receiving lens 21.

The image sensor 22 is an image pickup element that picks up an image of the work W based on the laser light reflected from the surface of the work W to obtain the coordinate value of each spot of the work W. The image sensor 22 outputs the obtained coordinate value to the controller 30. Thus, the image sensor 22 serves as an image pickup section that picks up an image of the work W based on the laser light transmitted through the liquid crystal shutter array 14, and further reflected on the surface of the work W.

The controller 30 includes a CPU (Central Processing Unit), a RAM (Random Access Memory), a ROM (Read Only Memory), and the like, and is connected to the optical section 10, and the image pickup section 20.

The CPU reads various processing programs stored in the ROM to expand the programs into the RAM, and executes various types of processing in cooperation with the expanded programs. Thus, the CPU performs an overall control of the optical probe 1.

The RAM expands the processing programs, which are executed by the CPU, into a program storage area within the RAM, and stores input data and processing result data, which is produced through the execution of the programs, in a data storage area.

The ROM, which is composed of a non-volatile semiconductor memory, stores a system program to be executed by the CPU, various processing programs to be executed in the system program, data to be used when the various processing programs are executed, and data of various processing results acquired through arithmetic processing by the CPU. The programs are stored in the ROM in the form of a computer-readable program code.

The controller 30 controls the cells of the liquid crystal shutters to open or close, and thereby, controls transmission of the linear laser light through the cells for every cell. Specifically, controller 30 sequentially opens the liquid crystal shutters one by one from one end to the other end thereof, and closes the liquid crystal shutters except for a liquid crystal shutter that has just been opened. Thereby, the parts constituting the linear laser light are transmitted sequentially in the order from one end part to the other end part of the linear laser light.

The controller 30 determines existence or non-existence of a virtual image based on an image of the work W picked up by the image sensor 22. If it is determined that a virtual image exists, the controller 30 blocks the transmission of the light which causes the formation of the virtual image.

In the optical probe 1, the shape of the work W is continuously picked up by the image sensor 22 in sequence. Accordingly, existence or non-existence of a virtual image can be determined in such a way that, when a picked-up image position has changed from the last picked-up image position by a predetermined threshold value or more, it is determined that a virtual image exists.

Figure 8:
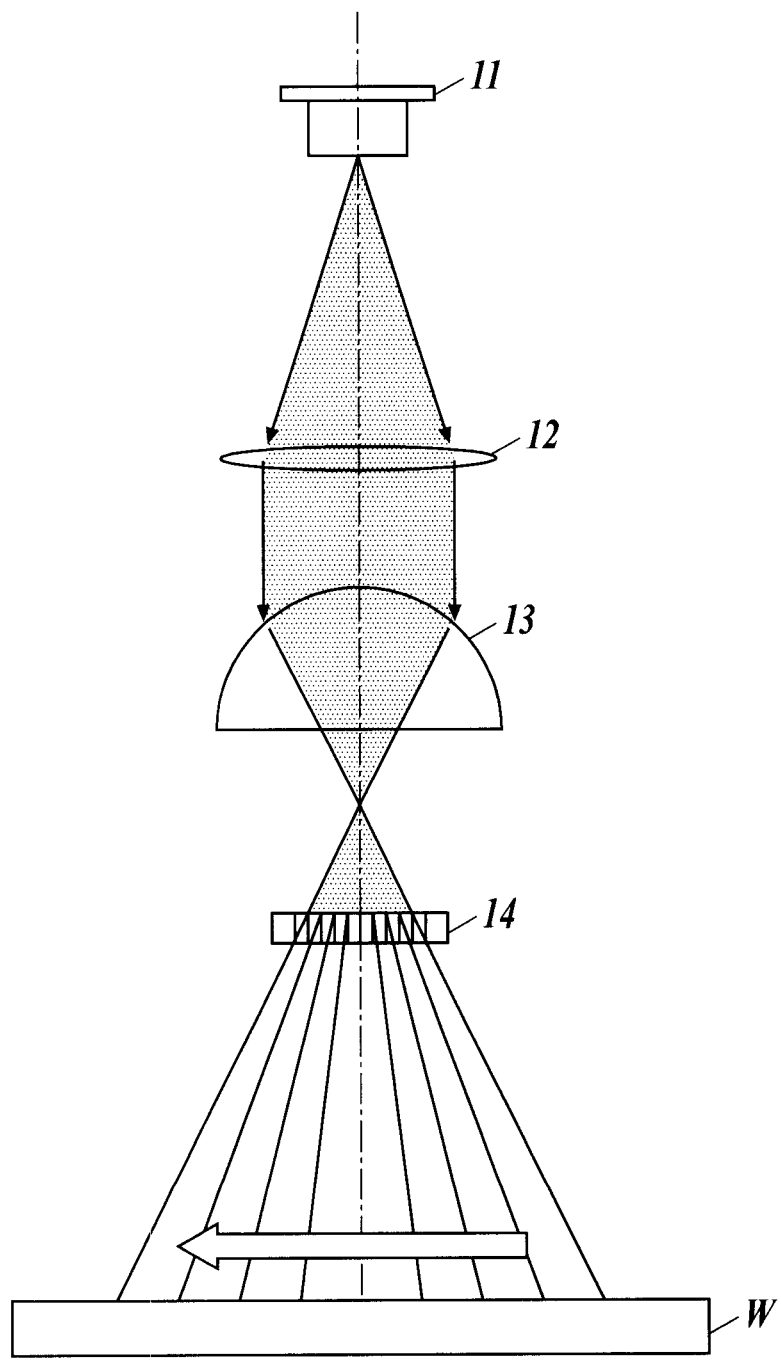
FIG. 8 is a schematic view illustrating a state in which an object to be measured is irradiated with point laser light in such a way that the point laser light draws a line on the object.

Next, the operation of the optical probe 1 according to the second embodiment will be described with reference to FIG. 8 and FIG. 9.

First, laser light is emitted from the laser light source 11 of the optical probe 1. The laser light emitted from the laser light source 11 goes to the beam expander 13 through the collimator lens 12. The beam expander 13 allows the light from the collimator lens 12 to change shape into linear laser light.

Then, the linear laser light travels to the liquid crystal shutter array 14, and transmission of the linear laser light through the cells of the liquid crystal shutter array 14 is controlled for every cell.

Specifically, the liquid crystal shutters arranged in a row included in the liquid crystal shutter array 14 are sequentially opened one by one from one end to the other end thereof, and the liquid crystal shutters except for a liquid crystal shutter that has just been opened are closed. That is, the number of open cells is always only one, and the linear laser light is transmitted through only an open cell. Therefore, the work W is always irradiated with point laser light.

The cells of the liquid crystal shutters are sequentially opened one by one from one end to the other end of the cells. Therefore, the work W is irradiated with the point laser light in such a way that the point laser light draws a line thereon (See FIG. 8).

Thus, the optical probe 1 can measure the form of the work W in sequence without being equipped with a moving mechanism, such as a galvanometer mirror or a polygon mirror, in the optical system. Accordingly, it is not necessary to maintain the moving mechanism and to adjust the accuracy of the moving mechanism. In addition, even when a virtual image is formed due to multiple reflections, the virtual image can easily be recognized.

The light, which is irradiated on the work W in the above-described way, is reflected on the surface of the work W to be incident upon the image sensor 22 through the light-receiving lens 21. Thus, the image of the work W can be picked up. Then, the controller 30 determines existence or non-existence of a virtual image based on the image of the work W picked up by the image sensor 22. Since the optical probe 1 irradiates the work W in such a way that the point laser light draws a line on the surface of the work W, even when a virtual image is formed due to multiple reflections, the virtual image can easily be recognized. Furthermore, the light that causes the formation of the virtual image can be identified in the linear laser light.

Figure 9:
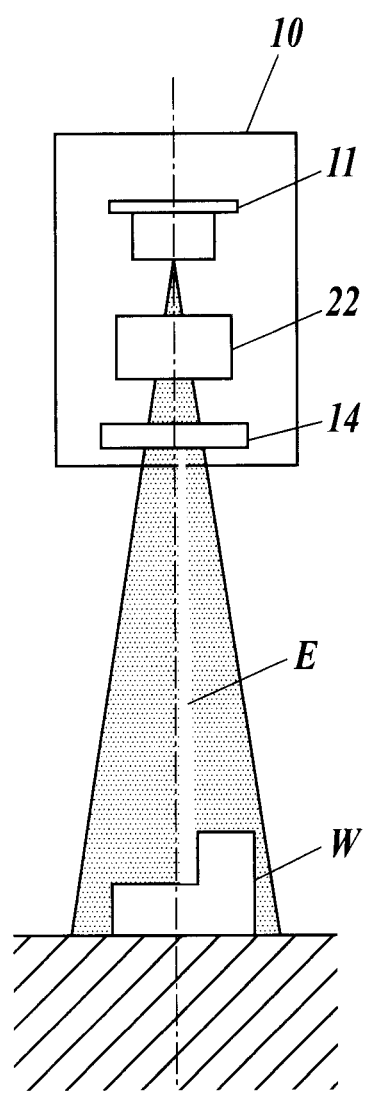
FIG. 9 is a schematic view illustrating a state in which the cells, involved in formation of a virtual image, are closed to block transmission of light at the closed cells.
Figure 10:
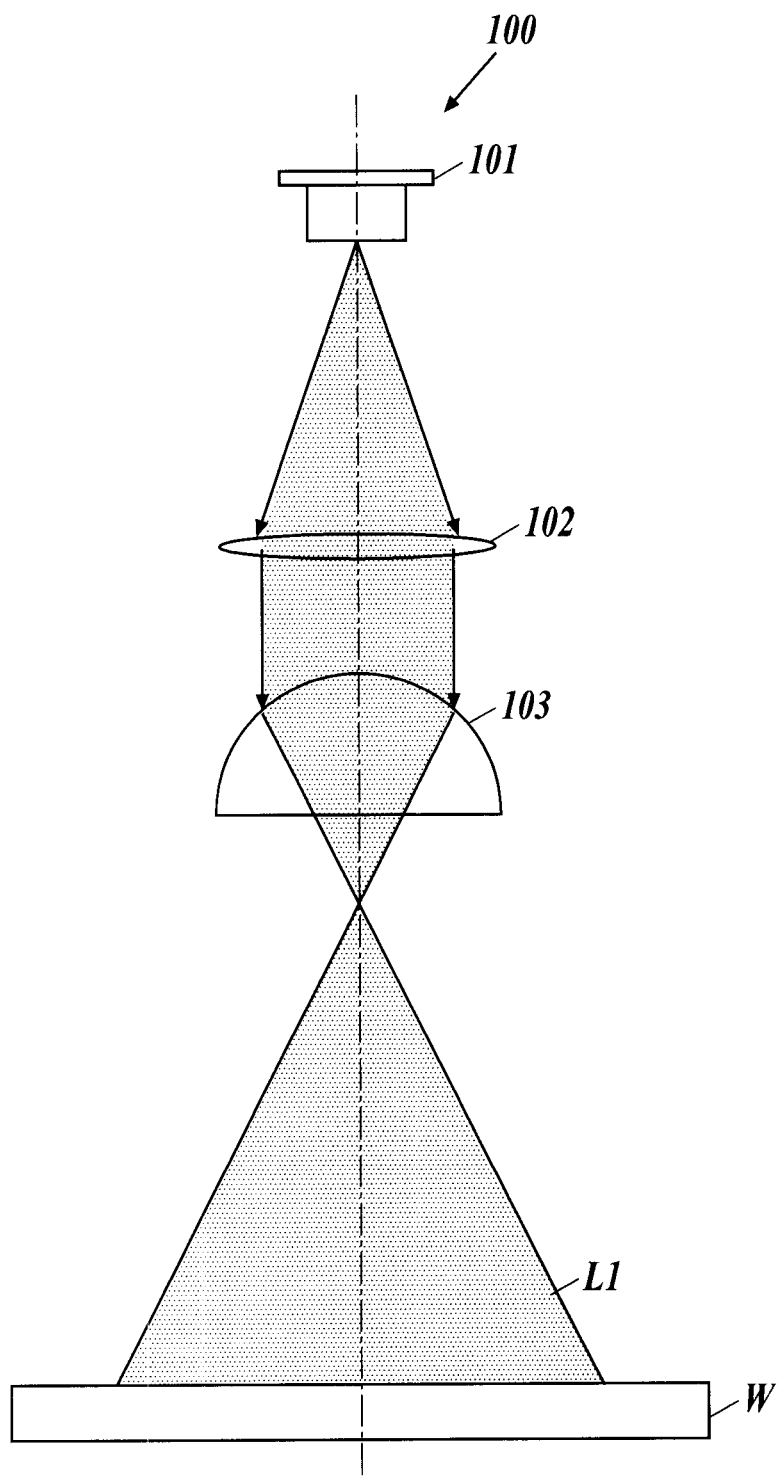
FIG. 10 is a schematic view of an optical system in a conventional linear optical probe.
Figure 11:
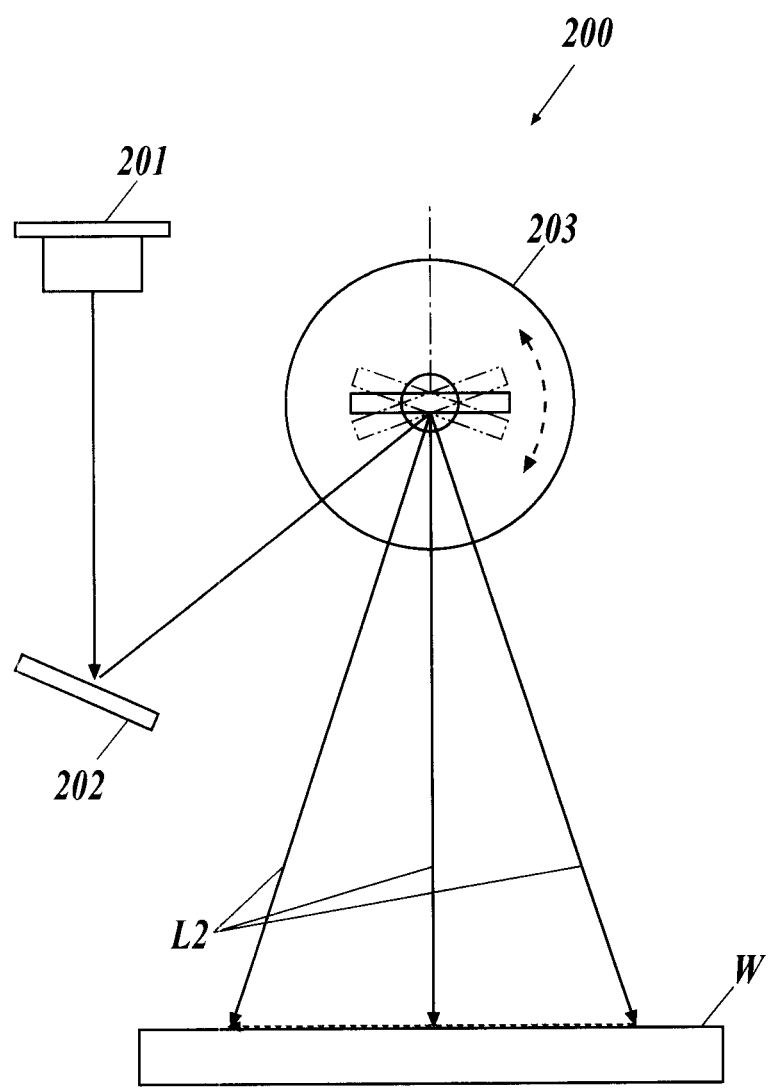
FIG. 11 is a schematic view of an optical system in a conventional flying spot optical probe.
Figure 12:
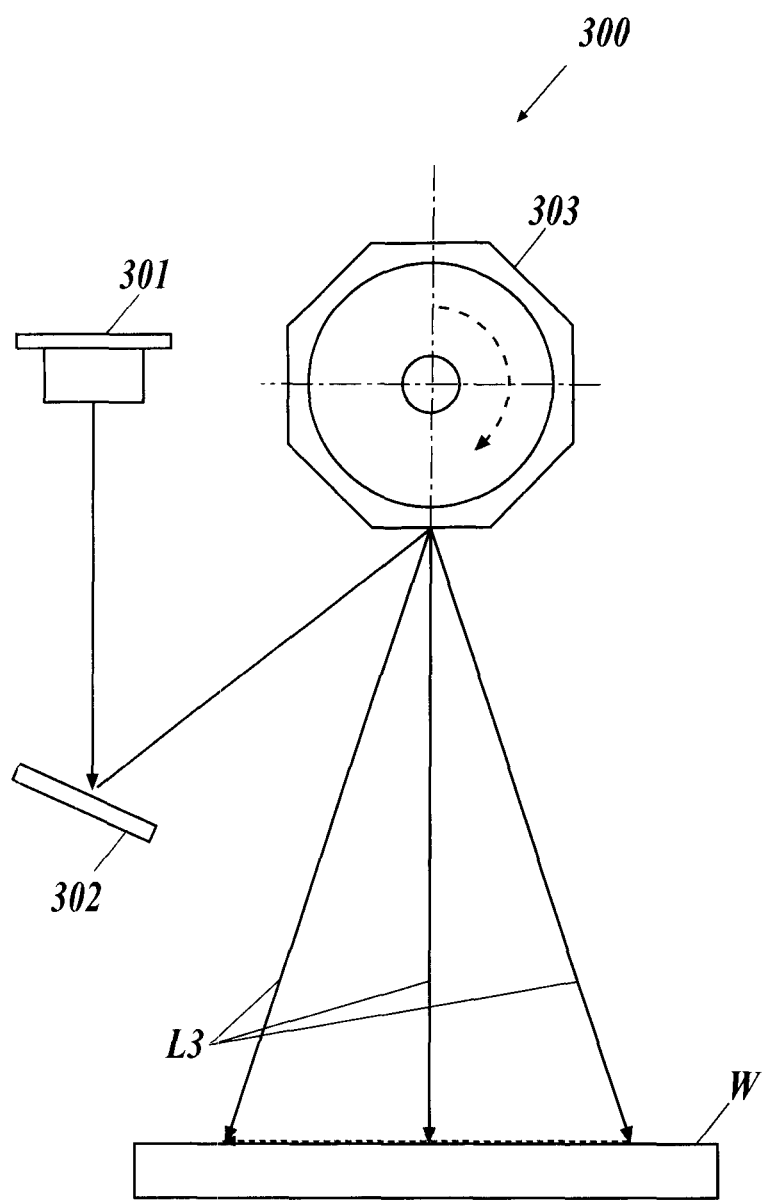
FIG. 12 is a schematic view of an optical system in a conventional rotating mirror optical probe.
Figure 13A:
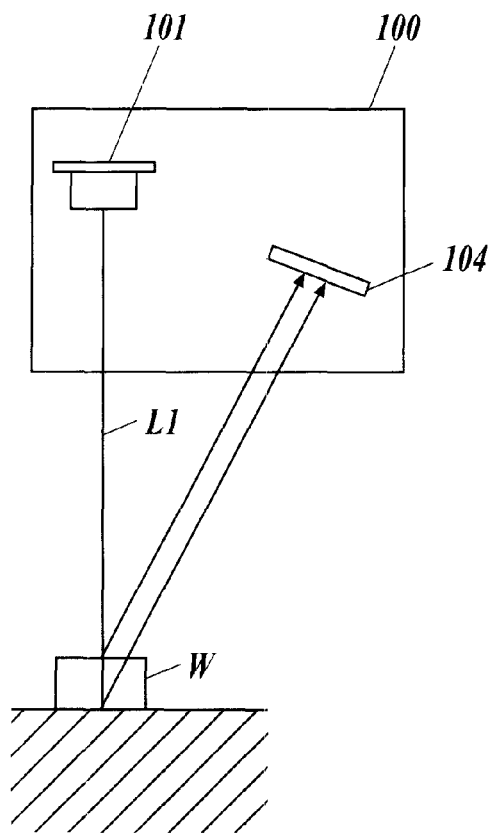
FIG. 13A is a front view illustrating measurement of the form of an object with a conventional linear optical probe.
Figure 13B:
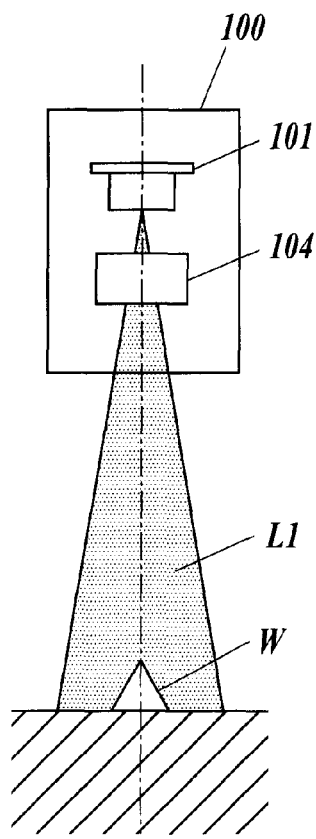
FIG. 13B is a side view illustrating measurement of the form of an object with a conventional linear optical probe.
Figure 14:
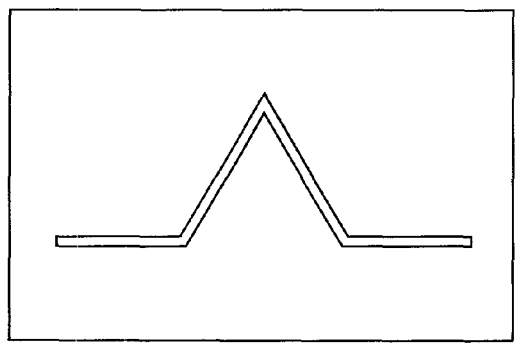
FIG. 14 shows an example of the form of an object to be measured picked up by the optical probe of FIG. 13.
Figure 15:
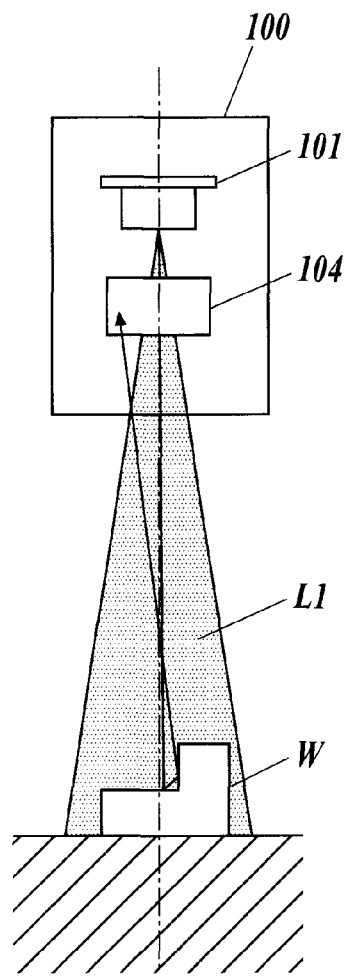
FIG. 15 is a side view illustrating a state in which multiple reflections occur in measuring the form of an object with a conventional linear optical probe.
Figure 16:
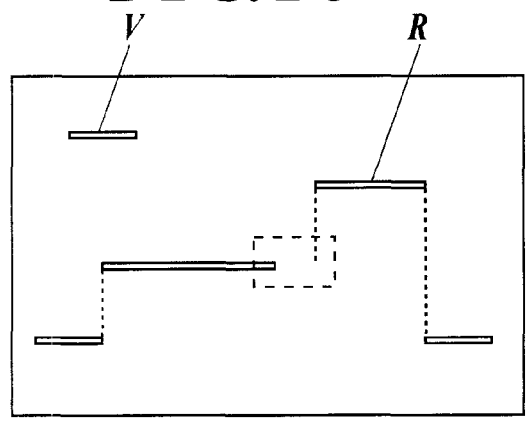
FIG. 16 shows an example of the form of an object to be measured and a virtual image picked up by the optical probe of FIG. 15.

When determining that a virtual image exists, the controller 30 blocks transmission of apart of the linear laser light which causes the formation of the virtual image, as shown in FIG. 9. That is, the cells of the liquid crystal shutters, which are involved in the formation of the virtual image, are closed so that the light transmission is blocked thereat. Accordingly, the formation of a virtual image can be prevented (see FIG. 5).

As described above, according to the optical probe 1 of the second embodiment, the linear laser light is composed of a plurality of parts (corresponding to the respective cells) including one end part and other end part (corresponding to one end and the other end of the cells); and the controller 30 controls the irradiating section so that the irradiating section irradiates the work W with the parts of the linear laser light sequentially from the one end part to the other end part (corresponding to sequentially opening the cells one by one), in a similar manner as the optical probe 1A of the first embodiment. Therefore, the optical probe 1 can measure the form of the work W in sequence without being equipped with a moving mechanism, such as a galvanometer mirror or a polygon mirror, in the optical system. Accordingly, it is not necessary to maintain the moving mechanism and to adjust the accuracy of the moving mechanism. In addition, even when a virtual image is formed due to multiple reflections, the virtual image can easily be recognized.

In particular, according to the optical probe 1 of the second embodiment, the irradiating section is the liquid crystal shutter array 14 that includes the liquid crystal shutters arranged in a row and that transmits a selected part of the linear laser light. In addition, the controller 30 sequentially opens the liquid crystal shutters one by one from one end to the other end thereof, and closes the liquid crystal shutters except for a liquid crystal shutter that has just been opened. Since the liquid crystal shutter array 14 can control irradiation with high accuracy, the optical probe 1 can perform irradiation control by utilizing such advantages of the liquid crystal shutter array 14, which provides more reliable measurement results.

Furthermore, according to the optical probe 1 of the second embodiment, the controller 30 determines existence or non-existence of a virtual image based on an image of the work W picked up by the image sensor 22, in a similar manner as the optical probe 1A of the first embodiment. If it is determined that a virtual image exists, the controller 30 blocks transmission (irradiation) of a part of the linear laser light that causes the formation of the virtual image. Accordingly, the formation of the virtual image is prevented, which results in efficient measurement.

In the above, embodiments of the present invention are described in detail. However, the present invention is not limited to the embodiments, and hence can be appropriately modified without departing from the scope of the present invention.

For example, in the first embodiment, the micromirrors, to which the linear laser light is thrown, are sequentially turned on one by one from one end to the other end of the micromirrors. However, the present invention is not limited thereto. For example, the micromirrors may be turned on sequentially from one end to the other end by a plurality of micromirrors (two by two, for example).

Further, in the first embodiment, the DMD 15 is taken as an example of the light reflecting section. However, the present invention is not limited thereto, but any type of light reflecting section may be employed as long as it has a function of reflecting a selected part of the linear laser light.

Further, in the second embodiment, the cells included in the liquid crystal shutter array 14 are sequentially opened one by one from one end to the other end thereof. However, the present invention is not limited thereto. For example, the cells may be opened sequentially from one end to the other end by a plurality of cells (two by two, for example).

Further, in the second embodiment, the liquid crystal shutter array 14 is taken as an example of the light transmitting section. However, the present invention is not limited thereto, but any type of light transmitting section may be employed as long as it is an array of microparticles that have a shutter function to block light (i.e., a shutter array). For example, a MEMS shutter array, or a PLZT shutter array may be employed instead of the liquid crystal shutter array 14.

Further, in the first and second embodiments, existence or non-existence of a virtual image is determined in such a way that, when a picked-up image position has changed from the last picked-up image position by a predetermined threshold value or more, it is determined that a virtual image exists. However, the determination method is not limited thereto, but any method may be employed as long as it can determine existence/non-existence of a virtual image.

In addition, detailed configurations and operations of the components of the optical probes 1A and 1 can also be appropriately modified without departing from the scope of the present invention.

The entire disclosure of Japanese Patent Application No. 2011-216055 filed on Sep. 30, 2011 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An optical probe comprising:
a laser light source that emits laser light;
a collimator lens that converts the laser light emitted from the laser light source into parallel light;
a light shape changing section that allows the parallel light to change shape into linear laser light;
an irradiating section to irradiate an object to be measured with a selected part of the linear laser light;
an image pickup section that picks up an image of the object based on the laser light reflected from a surface of the object irradiated with the selected part of the linear laser light; and
a controller that controls irradiation of the linear laser light by the irradiating section, wherein
the linear laser light is composed of a plurality of parts including one end part and the other end part; and
the controller controls the irradiating section so that the irradiating section irradiates the object with the parts of the linear laser light sequentially from the one end part to the other end part.

2. The optical probe according to claim 1, wherein the irradiating section is a light reflecting section that reflects the selected part of the linear laser light.

3. The optical probe according to claim 2, wherein
the light reflecting section is a DMD (Digital Mirror Device) that includes a plurality of micromirrors arranged in grid-like fashion; and
when the linear laser light is thrown to some of the micromirrors, the controller turns on the some of the micromirrors sequentially from one end to the other end thereof, and turns off the some of the micromirrors except for a micromirror that has just been turned on.

4. The optical probe according to claim 1, wherein the irradiating section is a light transmitting section that transmits the selected part of the linear laser light.

5. The optical probe according to claim 4, wherein
the light transmitting section is a shutter array that includes shutters arranged in a row; and
the controller opens the shutters sequentially from one end to the other end thereof, and closes the shutters except for a shutter that has just been opened.

6. The optical probe according to claim 5, wherein
the shutter array is one of a liquid crystal shutter array, a MEMS shutter array, and a PLZT shutter array.

7. The optical probe according to claim 1, wherein
the controller determines existence or non-existence of a virtual image based on the image of the object, the image being picked up by the image pickup section; and
when the controller determines that the virtual image exists, the controller prevents a part of the linear laser light from travelling toward the object, the part of the linear laser light causing formation of the virtual image.

8. The optical probe according to claim 2, wherein
the controller determines existence or non-existence of a virtual image based on the image of the object, the image being picked up by the image pickup section; and
when the controller determines that the virtual image exists, the controller prevents a part of the linear laser light from travelling toward the object, the part of the linear laser light causing formation of the virtual image.

9. The optical probe according to claim 3, wherein
the controller determines existence or non-existence of a virtual image based on the image of the object, the image being picked up by the image pickup section; and
when the controller determines that the virtual image exists, the controller prevents a part of the linear laser light from travelling toward the object, the part of the linear laser light causing formation of the virtual image.

10. The optical probe according to claim 4, wherein
the controller determines existence or non-existence of a virtual image based on the image of the object, the image being picked up by the image pickup section; and
when the controller determines that the virtual image exists, the controller prevents a part of the linear laser light from travelling toward the object, the part of the linear laser light causing formation of the virtual image.

11. The optical probe according to claim 5, wherein
the controller determines existence or non-existence of a virtual image based on the image of the object, the image being picked up by the image pickup section; and
when the controller determines that the virtual image exists, the controller prevents a part of the linear laser light from travelling toward the object, the part of the linear laser light causing formation of the virtual image.

12. The optical probe according to claim 6, wherein
the controller determines existence or non-existence of a virtual image based on the image of the object, the image being picked up by the image pickup section; and
when the controller determines that the virtual image exists, the controller prevents a part of the linear laser light from travelling toward the object, the part of the linear laser light causing formation of the virtual image.

* * * * *